No. 854,709. PATENTED MAY 28, 1907.
J. ABRAHAMSON.
ELECTRICAL MEASURING INSTRUMENT.
APPLICATION FILED AUG. 27, 1906.
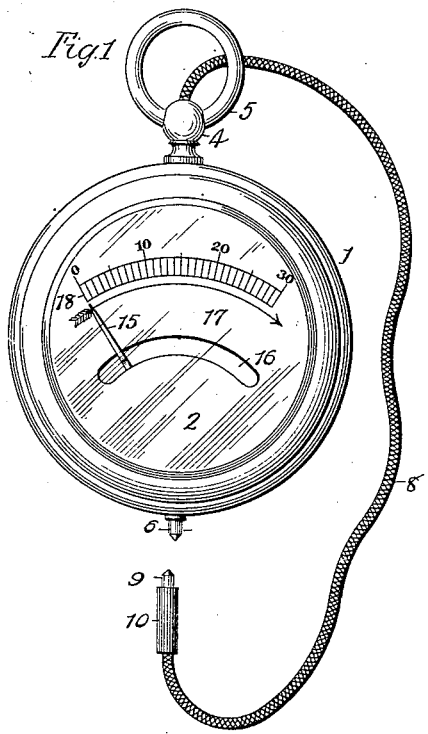
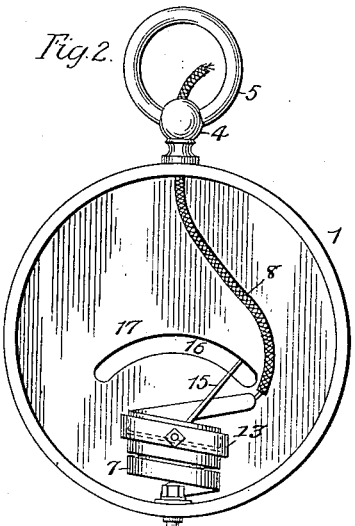
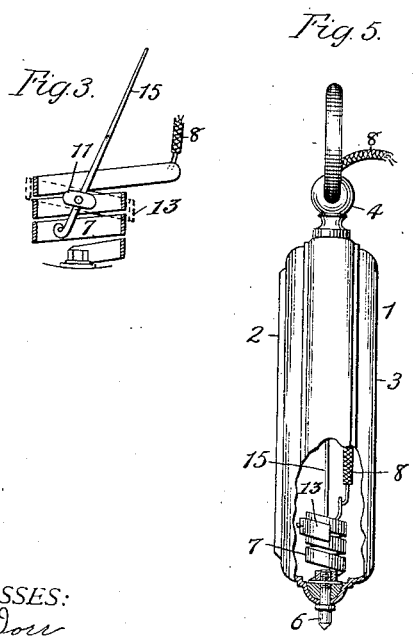
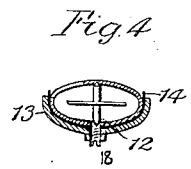
WITNESSES:
Anna M. Dorr
Chas. B. Shumway
Joseph Abrahamson
INVENTOR.
BY Barthel & Barthel
ATTORNEYS

UNITED STATES PATENT OFFICE.

JOSEPH ABRAHAMSON, OF DETROIT, MICHIGAN.

ELECTRICAL MEASURING INSTRUMENT.

No. 854,709.  Specification of Letters Patent.  Patented May 28, 1907.

Application filed August 27, 1906. Serial No. 332,189.

*To all whom it may concern:*

Be it known that I, JOSEPH ABRAHAMSON, a citizen of the United States of America, residing at Detroit, in the county of Wayne and State of Michigan, have invented certain new and useful Improvements in Electrical Measuring Instruments, of which the following is a specification, reference being had therein to the accompanying drawings.

This invention relates to instruments for electrical measurement and the object is to produce a simple and complete instrument that may be easily carried around in the pocket and is reliable in its indications.

To this end the invention consists in the novel construction and arrangement of parts as more fully hereinafter described and shown in the accompanying drawings in which my invention is shown as adapted for use as an ammeter and wherein Figure 1, is a front elevation thereof, Fig. 2, is a rear elevation with the rear wall of the case removed, Fig. 3, is a detached vertical section through the coil, Fig. 4, is a horizontal section through the coil, Fig. 5, is a side elevation with parts of the casing broken away.

The numeral 1 designates as a whole a suitable casing inclosing the parts, it is preferably in the form of a watch casing having a crystal front 2, a removable back 3, the pendant 4, and ring 5, attached to it. At the point diametrically opposite to the pendant 4, an outwardly projecting contact stud 6 is rigidly secured in the casing and to the inner end thereof is secured one end of the coil 7 formed of a large ribbon like diamagnetic conductor. The coil is flattened and composed of few helical convolutions which are separated from each other by air spaces sufficient to electrically insulate them. To the inner end of the coil is secured an insulated conductor 8 which passes out through a hole in the pendant of the casing and has a free end to which is attached and exposed contact stud 9 incased in an insulating finger piece 10. The conductor 8, at least that portion which extends outside the casing, is flexible and is of a convenient length to connect the instrument in an electrical circuit between distant poles by means of the studs 6 and 9. Supported in the coil is an armature 11 of elongated shape and provided with pivots 12 supported in suitable bearings in the coil transversely to the axis thereof and adapting the armature to oscillate in the axial plane of the coil. Upon the outside of the coil and extending parallel to the convolution thereof is secured a permanent magnet 13 which extends a sufficient distance around the coil to form a magnetic field for the armature. This magnet is preferably screened from the coil by an interposed strip of rubber cloth 14 and it is preferably secured to the coil by a single screw and nut 18. Attached to the armature is the balanced index hand 15 which is made of a thin strip of aluminium and extends with its long arm through a slot 16 in the dial plate 17 and to the index 18 carried upon the dial plate and which is suitably calibrated to indicate from zero up to the maximum indication for which the instrument is designed.

In use the instrument is placed in circuit with a battery or other source of electrical energy which it is desired to measure by bringing the contact studs in electrical contact with opposite terminals thereof. The current will then flow through the coil and the armature will be deflected from its zero position in which it is held by the magnet, with a certain force proportionate to the current. The index finger can be readily adjusted to the zero point by adjusting the position of the magnet upon its fastening which forms a pivot upon which it may be turned within a limited angle. The construction of the instrument is thus very simple and the manner of supporting the movable parts directly upon the conductor, which latter is itself in flexible connection with the casing, protects the instrument from being injured by jarring or rough usage. Excepting the flexible conductor there is no insulation and no damage from heating can arise.

Having thus fully described my invention what I claim is:—

1. In an electrical measuring instrument, the combination with the casing, its slotted dial and scale thereon, of a coil in the casing forming part of a conductor adapted to convey the current to be measured through the coil, said coil being flattened on opposite sides and formed of a ribbon like conductor of large capacity the individual turns of which are separated by air spaces, a shaft pivoted in the flattened sides of the coil an armature and a balanced index hand upon the shaft and a permanent magnet secured upon the coil and coöperating with the armature.

2. In an electrical measuring instrument, the combination with the casing, its slotted dial and the scale thereon, of a coil in the casing forming part of a conductor adapted to convey the current to be measured through the coil, said coil being flattened upon opposite sides and formed of a ribbon like conductor of large capacity the individual turns of which are separated by air spaces, an armature pivotally supported in the coil and carrying a balanced index hand, and a permanent magnet pivotally adjustably secured upon the coil and coöperating with the armature.

3. In an electrical measuring instrument, the combination with an inclosing casing, the slotted dial and scale thereon, of a conductor comprising a fixed contact stud, a coil and an insulated flexible conductor carrying a contact stud at the outer end thereof, the fixed contact stud and the flexible conductor secured in the wall of the casing and extending externally and internally thereof and the coil connected to the inner ends thereof and supported by the fixed contact stud within the casing free and independent thereof, said coil formed of a rigid conductor and supporting the operating parts of the instrument free and independent of the casing.

4. In an electrical measuring instrument, the combination of an inclosing casing, a coil formed of a rigid conductor the individual turns of which are separated from each other by air spaces, a contact stud secured in the wall of the casing and projecting inwardly thereof a limited distance, the coil being secured to its inner end and supported thereby free and independently of the casing, and a flexible insulated conductor passing through an aperture in the wall of the casing and having its inner end secured to the coil and its outer end provided with a contact stud.

5. In an electrical measuring instrument, the combination of an inclosing casing, a coil formed of a rigid conductor the individual turns of which are separated from each other by air spaces, a contact stud secured in the wall of the casing and projecting inwardly thereof a limited distance—the coil being secured thereto and supported thereby free and independently of the casing, a flexible conductor passing through the wall of the casing and having its inner end secured to the coil and its outer end provided with a contact stud, and devices actuated by the passage of a current through the coil, said devices wholly supported by the coil.

In testimony whereof I affix my signature in presence of two witnesses.

JOSEPH ABRAHAMSON.

Witnesses:
ANNA M. DORR,
CHAS. B. SHUMWAY.